Nov. 5, 1963  G. B. GRONVOLD  3,109,286
GAS TURBINE ENGINES
Filed Dec. 22, 1960  3 Sheets-Sheet 2
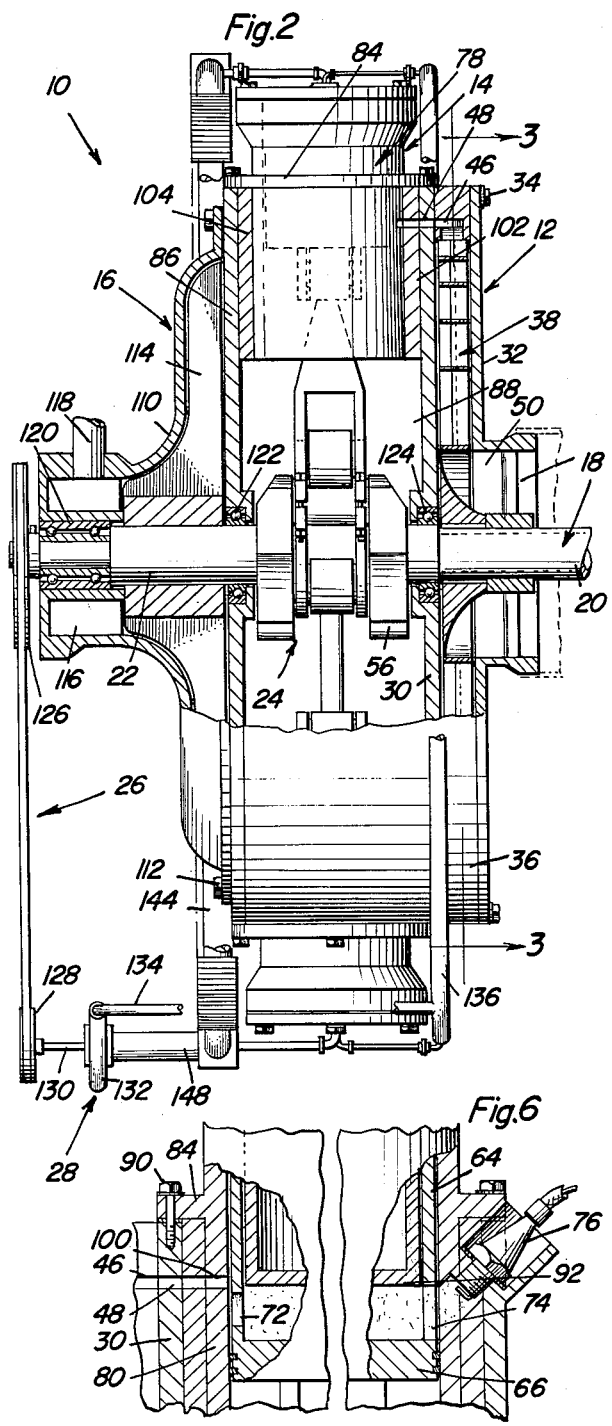
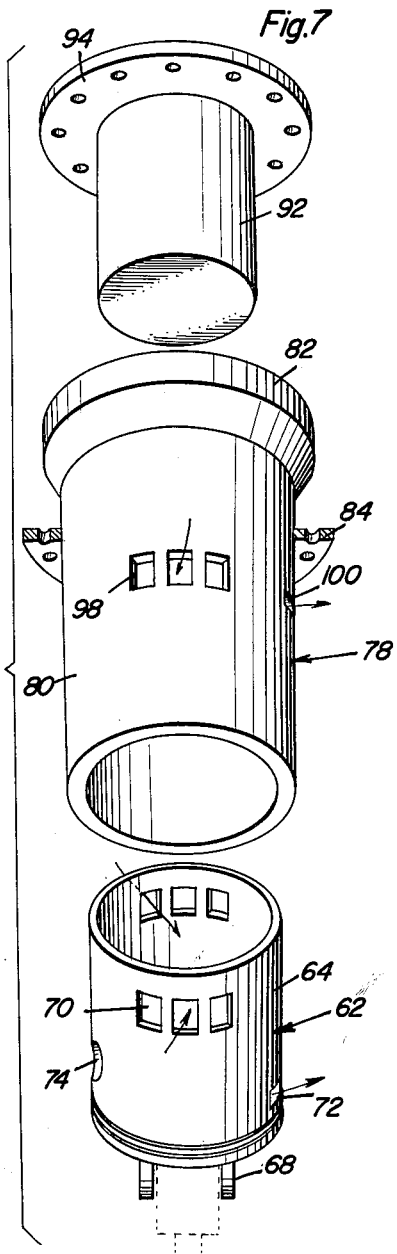
George B. Gronvold
INVENTOR.

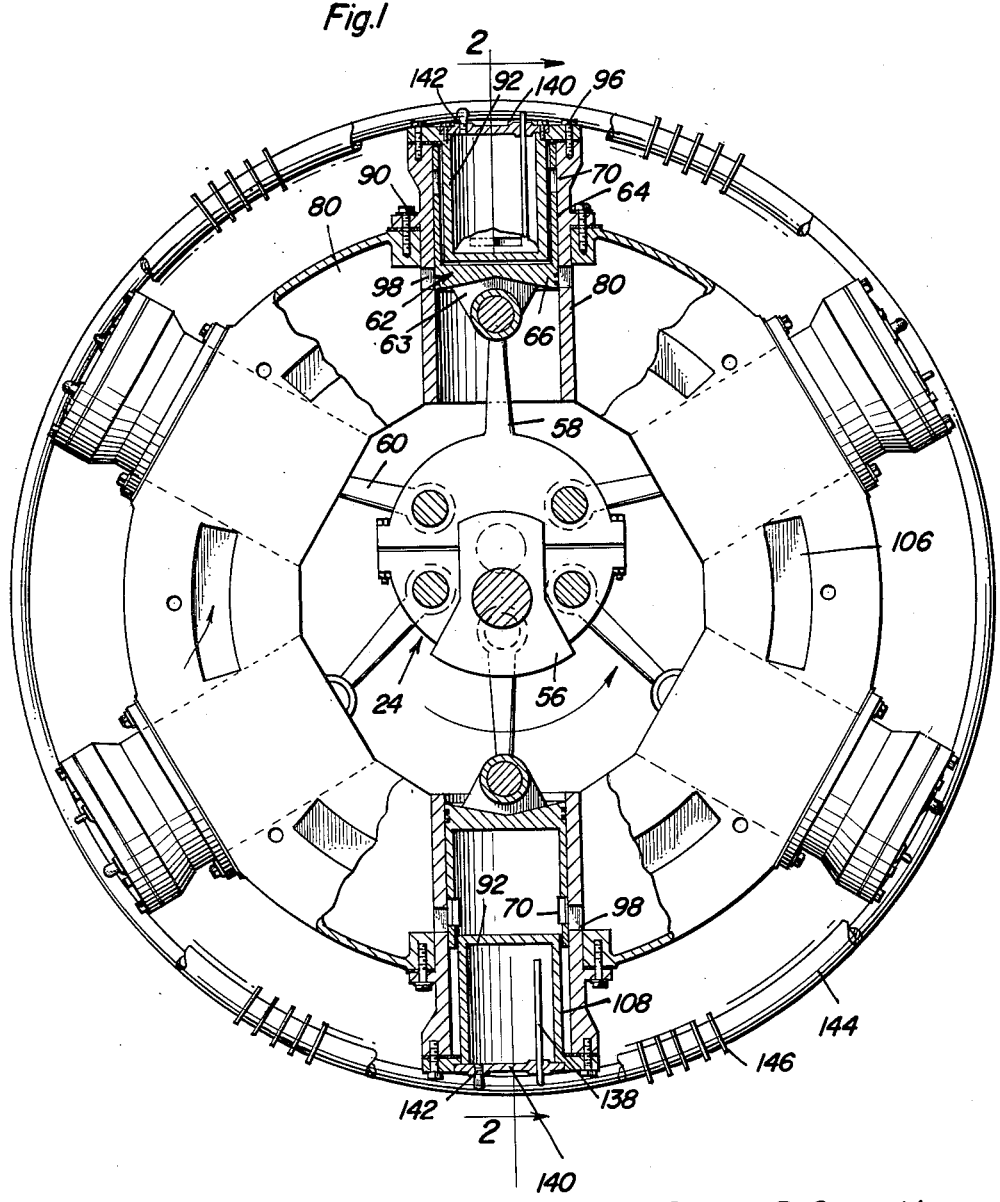

Nov. 5, 1963 G. B. GRONVOLD 3,109,286
GAS TURBINE ENGINES
Filed Dec. 22, 1960 3 Sheets-Sheet 3
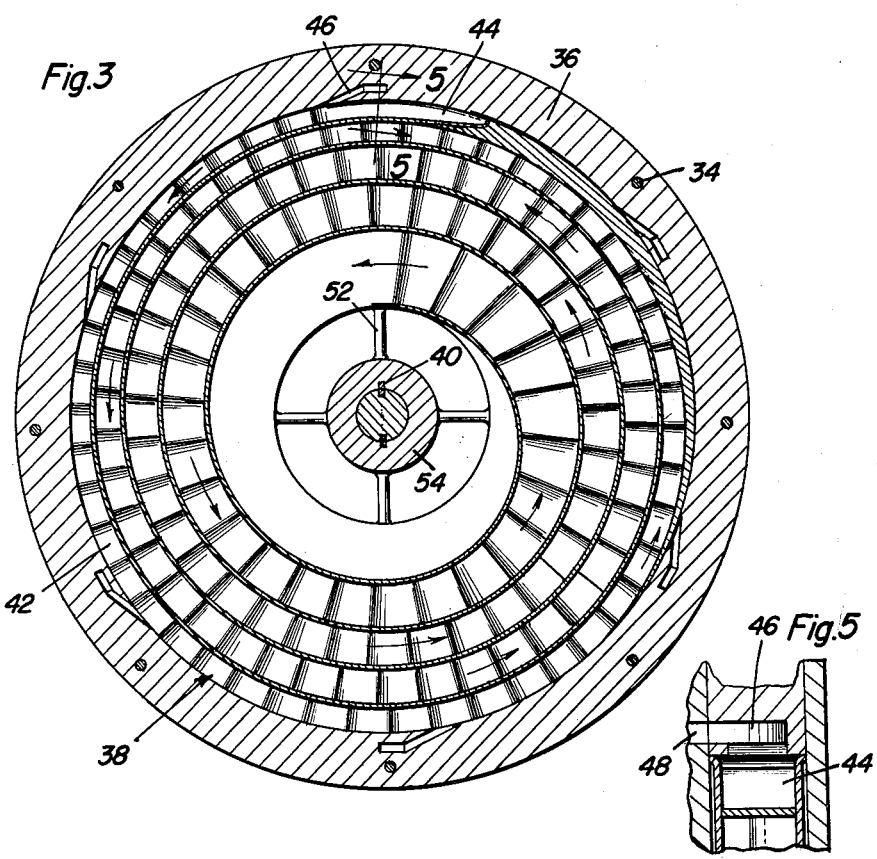
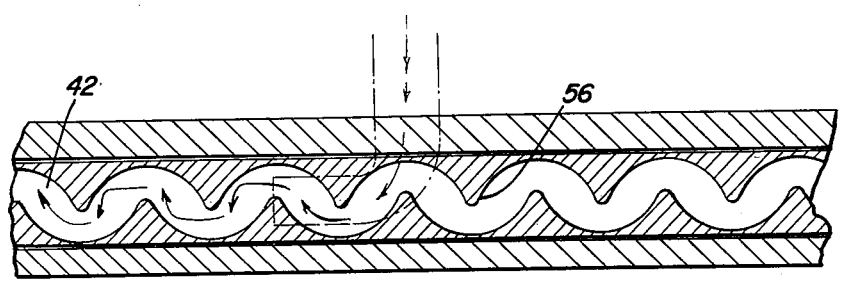
George B. Gronvold
INVENTOR.

United States Patent Office 3,109,286
Patented Nov. 5, 1963

3,109,286
GAS TURBINE ENGINES
George B. Gronvold, P.O. Box 727, Vancouver, Wash.
Filed Dec. 22, 1960, Ser. No. 77,726
8 Claims. (Cl. 60—39.34)

The present invention relates to gas turbine engines of the type employing a reciprocating internal combustion pressure generator supplying high velocity pressure fluid to a turbine wheel from which the power output is derived.

The gas turbine engine has heretofore been recognized as a more efficient and economical source of motive power and has accordingly been replacing the reciprocating type of internal combustion engine particularly in the larger power installations. Various drawbacks in the operation of gas turbine engines has however prevented its more widespread use particularly where large power to weight ratios are desired and in smaller power installations. Some of the drawbacks involve high turbine wheel speeds within the practical range of speed for the gas turbine engine requiring efficiency robbing reduction gearing which also presents space problems. Other disadvantages of the gas turbine engines heretofore proposed, involve the necessity for using costly multi-stage blading in order to prevent the inefficient waste of the kinetic energy of the pressure fluid entering the turbine wheel. Also, efficiencies of gas turbines have heretofore been limited by the efficiency of the engine compressor driven by the power turbine. It is therefore the primary object of this invention to provide a gas turbine which by virtue of its novel construction, arrangement and operation, will provide motive power with greater fuel economy, by an engine of unexpectedly small weight and extent for the power output thereof and which engine will require no reduction gearing nor complicated valve mechanism to insure proper operation thereof.

Another object of this invention is to provide a gas turbine engine which is characterized by a turbine wheel driven at a more useful lower speed and yet provide sufficient power for widespread use in automotive installations as well as for other installations requiring a high power to weight ratio and small size.

A further object of this invention is to provide a gas turbine engine which features a turbine wheel into which compressed and ignited pressure fluid is admitted at a radially outer portion for expansion through a continuous spiral path within the turbine wheel in lieu of plural stages of a multi-stage turbine. When the fluid is discharged therefore, at a low velocity, most of its kinetic energy will have been efficiently absorbed by the turbine wheel although available for reaction vane purposes if desired, as in multi-stage turbine wheels. Also, by virtue of the novel turbine wheel arrangement, the turbine wheel may be of unusual narrow extent in an axial direction to render the engine unexpectedly light and small.

An additional object of this invention is to provide a gas turbine engine which utilizes a combustion pressure generator in conjunction with the novel turbine wheel hereinbefore mentioned, which pressure generator involves reciprocating pistons driven solely by the turbine wheel which are reciprocable within a cylinder to compress a fluid fuel mixture and periodically discharge it into a radially outer inlet chamber of the turbine wheel. The fuel mixture just prior to discharge, is ignited in order to increase the pressure, temperature and velocity of the discharged fluid so as to provide a turbine wheel energized by intermittent pressure impulses. The piston of the pressure generator is furthermore unique in that no clearance volume space is provided, inasmuch as combustion occurs just prior to the end of the compression stroke with all of the products of combustion being discharged into the turbine wheel preventing the direct transfer of energy released by combustion to the piston crank shaft. On the return stroke of the piston, the discharge port in the cylinder is closed by the turbine wheel so as to draw a vacuum within the cylinder until the piston reaches the other end of the stroke at which point the inlet ports are opened by the piston in the cylinder wall to admit a fuel mixture from an inlet supply chamber which is maintained filled with fuel under pressure by a constant flow compressor driven by the power output turbine wheel. The piston and cylinder are therefore so designed as to compress fluid but not to sustain and transmit the explosive force of the combustion occurring within the cylinder as has characterized previous devices of this type. As a result thereof a hollow piston is utilized pursuant to the principles of this invention, the walls of which may be thinner and may move between an annular guideway formed between the cylinder walls and a cooling recess mounted on the cylinder which also serves to define the compression stroke of the piston. More efficient cooling of the parts may thereby be accomplished to overcome the heat removal problems that have heretofore plagued previous gas turbine engines.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an end elevational view of the gas turbine engine of this invention with parts broken away and shown in section.

FIGURE 2 is a sectional view taken substantially through a plane indicated by section line 2—2 in FIGURE 1.

FIGURE 3 is a sectional view taken substantially through a plane indicated by section line 3—3 of FIGURE 2.

FIGURE 4 is a partial sectional view of the turbine wheel.

FIGURE 5 is a partial sectional view taken substantially through the plane indicated by section line 5—5 of FIGURE 3.

FIGURE 6 is a partial break-away sectional view illustrating the piston in its position within the cylinder at the time firing occurs to ignite the fluid fuel mixture.

FIGURE 7 is a disassembled perspective view of one cylinder and piston assembly.

Referring now to the drawings in detail, the gas turbine engine of this invention is most completely illustrated in FIGURE 2 and is generally designated therein by reference numeral 10. It will be observed from FIGURE 2, that the engine 10 includes an output turbine assembly generally referred to by reference numeral 12 and internal reciprocating type combustion pressure generator generally referred to by reference numeral 14 and a fuel intake compressor unit generally referred to by reference numeral 16. It will also be noted, that the engine 10 is provided with an output shaft 18 including section 20 and section 22 interconnected by crank mechanism 24. A power take-off drive generally referred to by reference numeral 26 is driven by the output shaft section 22 to operate a water cooling circulatory system generally referred to by reference numeral 28. It will therefore be apparent that the engine 10 operates generally by supply of fuel to the pressure generator 14 by means of the fuel supply compressor unit 16, the pressure generator compressing, igniting and discharging a fuel mixture into the turbine assembly 12 for power output. The pressure generator 14 and fuel supply compressor 16 are in turn driven by the output shaft which also operates the water cooling system 28.

Referring now to FIGURES 2, 3, 4 and 5, it will be noted that the turbine assembly 12 includes an inlet plate member 30 disposed in axially spaced relationship to an outlet plate member 32 and connected thereto by a plurality of bolt members 34 through a peripheral outer housing portion 36 to form a casing for the turbine assembly 12. A rotor disk turbine wheel generally referred to by reference numeral 38 is fixed to the output shaft section 20 in any suitable manner such as by splines 40. The wheel 38 defines a rotational plane with respect to which a spiral passage 42 of progressively reducing radius is mounted. The radially outer end of the spiral passage 42 forms an inlet chamber 44 which communicates periodically with a plurality of equally spaced inlet passages 46 in the housing portion 36. The inlet passage 46 in the housing portion 36 is also aligned with a passage 48 in the inlet plate 30. The radially inner outlet end of the spiral passage 42 communicates with a discharge passage 50 which is formed by the outlet plate 32. The walls of the discharge passage 50 are supported on the output shaft section 20 by means of a plurality of spokes 52 connected to a hub 54 and to the annular inner surface of the discharge passage 50.

It will therefore be apparent that when the inlet passage 44 of the turbine wheel disk 38 is aligned with an inlet passage 46 and if at such time high energy fluid is discharged thereinto, the fluid will move in a counterclockwise direction as indicated by the arrows in FIGURE 3 through the spiral path of passage 42. In moving through the spiral passage, a plurality of axially inwardly projecting vane formations 56 in the spiral passage 52 will cause the fluid to move in a tortuous path which in so doing to further prolong the path of expanding gas for impulse of the turbine wheel 38. It will therefore be appreciated that as the fluid progresses along its spiral path its linear velocity relative to the spiral path will decrease. Also, by virtue of the progressive reduction in the radial distance of the spiral path from the axis of the output shaft, the simultaneous decrease in the linear velocity of the passage as it approaches the radial inner discharge end, will enable the turbine wheel to absorb the rotative torque from the fluid in a more efficient and complete manner. The high velocity fluid entering the radially outermost portion of the turbine wheel may therefore impart its highest linear velocity to the turbine wheel at said radially outermost portion with progressive reduction in the fluid velocity and linear velocity of the spiral path occurring simultaneously so that the turbine wheel may be driven at a relatively lower rotational speed without losing the kinetic energy of the fluid. It should also be noted that the inlet chamber 44 communicates with the inlet passage 46 only periodically, while at other times the inlet passage 46 is sealed by the turbine wheel 38 so as to avoid the use of exhaust valves for the generator 14.

Referring now to FIGURES 1, 2, 6 and 7, the pressure generator 14 will be described. It will be noted therefore that the output shaft 18 drives the crank mechanism 24 including a pair of crank arms 56 to which the master connecting rod 58 is connected and to which a plurality of other connecting rods 60 are pivotally connected. Each of the connecting rods are pivotally connected to the lower end of a hollow piston generally referred to by reference numeral 62. The piston 62 includes a thin cylindrical portion 64 and a bottom wall portion 66 to which the connecting rod is connected by means of a pair of downwardly depending pivot projections 63. It will be noted that the piston 62 includes adjacent the upper ends thereof a plurality of inlet ports 70 while at the lower end thereof there is provided a discharge port 72. An opening 74 in the piston wall 64 is also provided for communication with an igniting device such as the spark plug 76 as illustrated more particularly in FIGURE 6.

The piston 62 is therefore reciprocately mounted within the cylinder device 78. The cylinder 78 includes a cylindrical wall portion 80 having an upper enlarged portion 82 and an intermediate flange portion 84. The cylinder devices 78 are therefore mounted in circumferentially spaced equal relation on the plate 30 and the plate 86 between which there is formed a fuel inlet chamber 88. Fastener members 90 are therefore provided to securely mount the cylinder devices 78, by means of the flanges 84. Mounted within the cylinder devices 84 are inwardly projecting cup members 92 which include an upper flange 94 by means of which the cup members 92 are fastened by fasteners 96 to the enlarged portion 82 of the cylinder device 78. An annular guideway is thereby formed between the outer wall of the cup member 92 and the inner cylindrical wall of the cylindrical portion 80 of the cylinder device. Also, the cylinder device is provided with inlet ports 98 and with outlet port 100. The cylinder devices 78 are also mounted between the side plates 30 and 86 and are spaced therefrom by annular side portions 102 and 104 of the crankcase. A plurality of circumferentially spaced fuel inlet openings 106 are provided in the plate member 86 and portion 104.

It will therefore be apparent from the foregoing description of the pressure generator 14, that upon rotation of the output shaft 18, by means of the turbine assembly 12, the piston devices 62 will be reciprocated within the cylinder devices 78. As will be apparent from FIGURE 1, the piston 62 will move between an uppermost illustrated position with no clearance being provided inasmuch as all of the fluids within the cylinder will have been discharged through port 72 in the piston wall 64 and outlet port 100 in the cylinder wall 80 into the inlet passage 46 of the turbine assembly 12. Accordingly, firing of the fluid fuel mixture occurs just prior to alignment between the discharge port 72 in the piston 62 and the outlet port 100 in the cylinder device 78 as illustrated in FIGURE 6. The spark plug 76 which is therefore suitably timed in relation to the rotation of the outlet shaft 18 will fire through the passage 74 to ignite the fuel mixture. The piston 62 as illustrated in FIGURE 6 will subsequently continue to move upwardly so that the ignited fuel mixture may expand out through the outlet port 100 in the cylinder wall 80 into the inlet passage 46 of turbine assembly with the products of combustion being finally and completely discharged from the cylinder device when the piston 62 reaches the end of its stroke up against the cup member 92. No scavenging of the piston cylinder is therefore necessary, while a relatively smaller amount of the energy released by the explosion of the fuel mixture is directly converted into motive energy of the piston, since the primary function of the generator 14 is to supply high energy fluid to the turbine assembly from which the motive energy is obtained. The fluid so pressurized will immediately proceed through the turbine assembly as hereinbefore indicated which will also immediately cut off the outlet as the inlet chamber 44 of the turbine wheel moves away from communication with the inlet passage 46. Accordingly, when the piston 62 moves in its return stroke, the expanding chamber formed between the bottom 66 of the piston and the inner end of the cup member 92 will draw a vacuum until the piston reaches a position as illustrated in the lowermost portion of FIGURE 1 wherein the inlet port 70 of the piston previously disposed between the annular guideway 108 is now aligned with the inlet port 98 in the cylinder wall 80 to admit the fluid fuel in the fuel inlet chamber 88.

Contributing to the more efficient operation of the engine is the reduction in weight obtained by the use of an inverted hollow piston design supported on the wrist pin bosses 63 by means of which it is connected to the connecting rod 58 or 60. Accordingly, if so desired the piston bottom may be brought down to crank shaft clearance to reduce connecting rod weight and length. Further, since firing occurs just prior to the end of the compression stroke, most of the piston wall will be protectively disposed in the guideway between the cap 92 and the cylinder walls 80 and the flame will be confined within the piston to thereby avoid cylinder wall lubrication problems.

As was hereinbefore mentioned, the fuel inlet chamber 88 communicates with the fuel supplying compressor device 16 through the openings 106. It will therefore be observed that the compressor 16 is housed within the casing member 110 bolted by bolts 112 to the plate member 86. A compressor blade rotor 114 is keyed to the output shaft section 22 for the purpose of drawing an air-fuel mixture through inlet passage 116 from inlet conduit 118. The compressor 16 accordingly provides a constant flow of fuel mixture under pressure into the fuel inlet chamber 88 from which the fuel mixture is withdrawn by the pressure generator devices 14. It should be understood that although six piston cylinder devices are illustrated for the pressure generator 14, any number may be employed depending upon the design and power requirements.

It will be noted also, that the arrangement of the components 16, 14 and 12 as hereinbefore described are conveniently and efficiently disposed with respect to the output shaft 18. Accordingly, the output shaft includes at one end a spaced bearing assembly 120 for support thereof relative to the inlet passage 116 connected to the fixed casing 110 for the compressor unit 16. Bearings 122 and 124 are disposed on opposite sides of the crank mechanism 24 and accordingly provides spaced bearing supports therefor. The turbine assembly 12 is disposed on the side of the pressure generator 14 opposite the compressor 16 and thereby completes a neat and compact engine.

Connected to the output shaft section 22 is a power take-off pulley 126 for the purpose of imparting drive through the endless belt drive mechanism 26 to a pulley 128 connected by shaft 130 to a water cooling circulating pump 132 of the water cooling system 28. It will be noted therefore that the discharge of the pump 132 is connected by connecting conduit 134 to an annular supply conduit 136. The annular supply conduit 136 has connected thereto a plurality of water cooling supply tubes 138 which project inwardly within the cup members 92 of each of the cylinder devices 78. A closure member 140 for each of the cup members 92 through which the inlet tube 138 extends also mounts an outlet fitting 142 for receiving heated water for return to an annular return conduit 144. A plurality of cooling fins 146 are accordingly externally mounted on the outlet conduit 144. The annular outlet conduit 144 therefore has connected thereto a pump inlet conduit 148 whereby the water is circulated through the system 28.

From the foregoing description, operation and utility of the gas turbine engine of this invention will be apparent. It will therefore become apparent that the novel turbine assembly 12 and cooperating reciprocating type combustion pressure generator 14 endows the novel gas turbine engine device of this invention with extremely useful and important attributes. It will for example be noted that no separate pressure responsive or complicated valve system is required for engine operation as heretofore provided on comparable types of engines by virtue of the novel operational sealing relationship between the turbine assembly 12 and the cylinder devices 78 wherein only periodic communication is provided between the outlet ports of the cylinder devices and the inlet chamber of the turbine assembly. Furthermore, by virtue of the fact that no power is to be sustained or transmitted by the piston devices 62 its construction may include thin walls which may be cooled more rapidly together with the cylinder walls by the inwardly projecting cups 92 containing circulating cooling water supplied by the circulating pump type of cooling system which is of particular significance in gas turbine operation. The novel operation of the pressure generator 14 taken together with the continuous flow compressor supplying fuel thereto and the more efficiently operating turbine assembly, accordingly contributes to unexpectedly advantageous performance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A gas turbine engine comprising turbine wheel means, said turbine wheel means fixedly mounting direction changing flow passage means for receiving and conducting fluid under a high flow velocity head operative to thereby impart rotative torque to the turbine wheel means, pressure generating means having a compressive stroke and continuously driven solely by the turbine means for compressing combustible fluid, means responsive to rotation of the turbine means for periodically establishing fluid communication between said flow passage means and the pressure generating means substantially at the end of said compressive stroke thereof, and means for producing combustion of said combustible fluid within the pressure generating means externally of the turbine means substantially at the end of the compressive stroke when said fluid communication is established to supply said flow passage means with fluid under said high velocity head whereby all of the fluid following said combustion is transferred to the turbine wheel means.

2. The combination of claim 1 wherein said means for periodically establishing fluid communication includes mounting means for the pressure generating means and the turbine wheel means having a fixed passage simultaneously uncovered by the pressure generating means substantially at the end of the compressive stroke and the turbine means at an inlet end of the flow passage means mounted thereon.

3. The combination of claim 2, wherein said direction changing flow passage means comprises an arcuate conduit increasing in flow area in the direction fluid flow therethrough for expansion of the fluid.

4. The combination of claim 1, wherein said direction changing flow passage means comprises an arcuate conduit increasing in flow area in the direction fluid flow therethrough for expansion of the fluid, said conduit having a curvature exceeding 180° for changing the direction of fluid flow.

5. The combination of claim 2 wherein said pressure generating means includes cylinder means reciprocable piston means driven by the turbine means within the cylinder means to define a chamber varying in volume between substantially zero and a maximum, ports formed in the cylinder means and piston means for periodically admitting fluid into said chamber within the piston means and discharging compressed and ignited fluid into said flow passage means.

6. The combination of claim 1 wherein said pressure generating means comprises, cylinder means disposed within a pressure fluid inlet chamber, hollow piston means reciprocably mounted in said cylinder means, cylinder cooling recess means mounted in said cylinder means to form an annular guide-way for the piston means and define a position therefor of substantially zero volume, inlet and outlet ports formed in the cylinder means and piston means for periodically admitting fluid from the inlet chamber into an expanded volume chamber in the piston means and to periodically discharge fluid therefrom at the end of the compression stroke, said means for producing combustion including ignition means for igniting the fluid just before discharge thereof.

7. The combination of claim 6, wherein the pressure generating means further includes crank driven connecting rod means pivotally connected to the hollow piston means at a closed end thereof.

8. A turbine engine comprising, a combustion gas generator including piston means having a compression stroke for intermittently discharging combustion gas products from a combustion chamber reduced to zero volume by the piston means, turbine means having an inlet chamber and being drivingly connected to the combustion gas generator for operation of the piston means in timed relation to positioning of said inlet chamber for fluid communication with said piston means to receive combustion gas products intermittently discharged therefrom, said turbine means including an elongated continuous passage connected to the inlet chamber through which combustion gas products may expand and flow to impart rotative torque to the turbine means.

References Cited in the file of this patent
UNITED STATES PATENTS

| | | |
|---|---|---|
| 1,033,738 | Scott et al. | July 23, 1912 |
| 1,262,602 | Stedman | Apr. 9, 1918 |
| 1,508,441 | Brown | Sept. 16, 1924 |
| 1,849,170 | Buchi | Mar. 15, 1932 |
| 2,400,899 | Wilcox | May 28, 1946 |
| 2,445,222 | Jolly | July 13, 1948 |
| 2,792,818 | Lindstrom | May 21, 1957 |